United States Patent [19]

Decroix

[11] 4,126,649

[45] Nov. 21, 1978

[54] POLYOLEFINIC COMPOSITIONS CONTAINING E/VA COPOLYMER

[75] Inventor: Jean-Claude Decroix, Arras, France

[73] Assignee: Societe Chimique des Charbonnages - CdF Chimie, Paris, France

[21] Appl. No.: 807,133

[22] Filed: Jun. 16, 1977

[30] Foreign Application Priority Data

Jun. 21, 1976 [FR] France .................................. 76 18825

[51] Int. Cl.² ............................................. C08L 23/08
[52] U.S. Cl. .................................................. 260/897 B
[58] Field of Search ........................................ 260/897

[56] References Cited

U.S. PATENT DOCUMENTS

| | | | |
|---|---|---|---|
| 3,634,551 | 1/1972 | Stancell et al. ........................ | 260/897 |
| 3,694,524 | 9/1972 | Tinger et al. ......................... | 260/897 |
| 3,733,373 | 5/1973 | McConnell et al. ................. | 260/897 |
| 3,847,728 | 11/1974 | Hirata et al. ......................... | 161/252 |
| 4,045,515 | 8/1977 | Isaka et al. ........................... | 260/897 |

*Primary Examiner*—Carman J. Seccuro
*Attorney, Agent, or Firm*—Finnegan, Henderson, Farabow & Garrett

[57] ABSTRACT

Polyolefin compositions useful for making films having improved tensiometric properties and strength. The compositions comprise from 92 to 99% by weight of (1) a polyolefin having a melt index of 0.5 to 5 that is either isotactic poly-1-butene or a butene-ethylene copolymer containing less than 2% of ethylene units, and (2) from 1 to 8% of an ethylene-vinyl acetate copolymer having a vinyl acetate content of from 5 to 35% by weight and a melt index of from 0.5 to 5.

4 Claims, 4 Drawing Figures

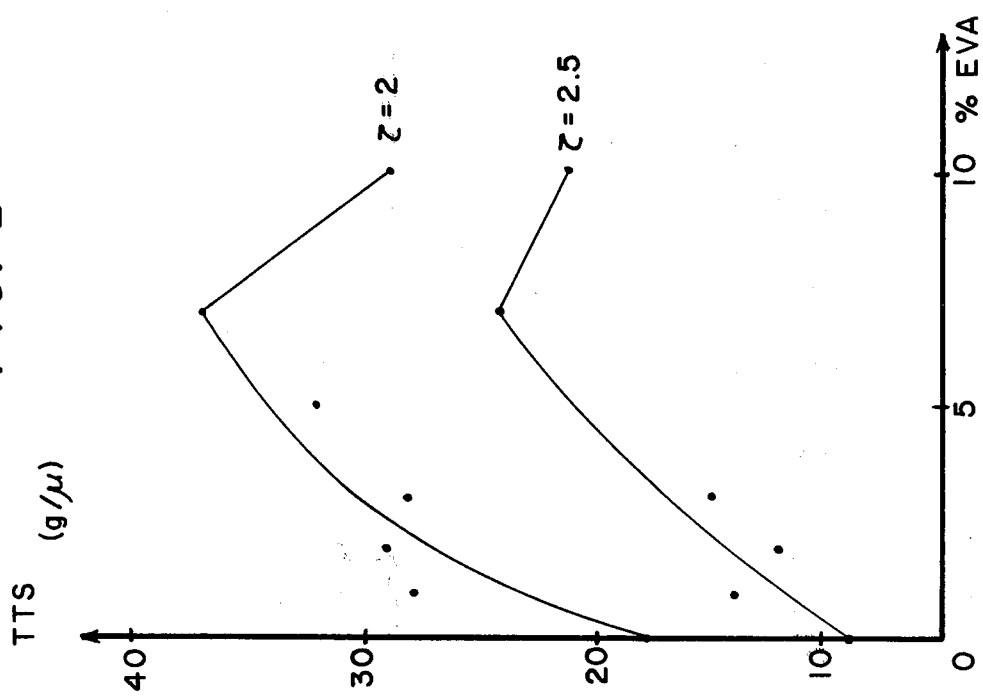
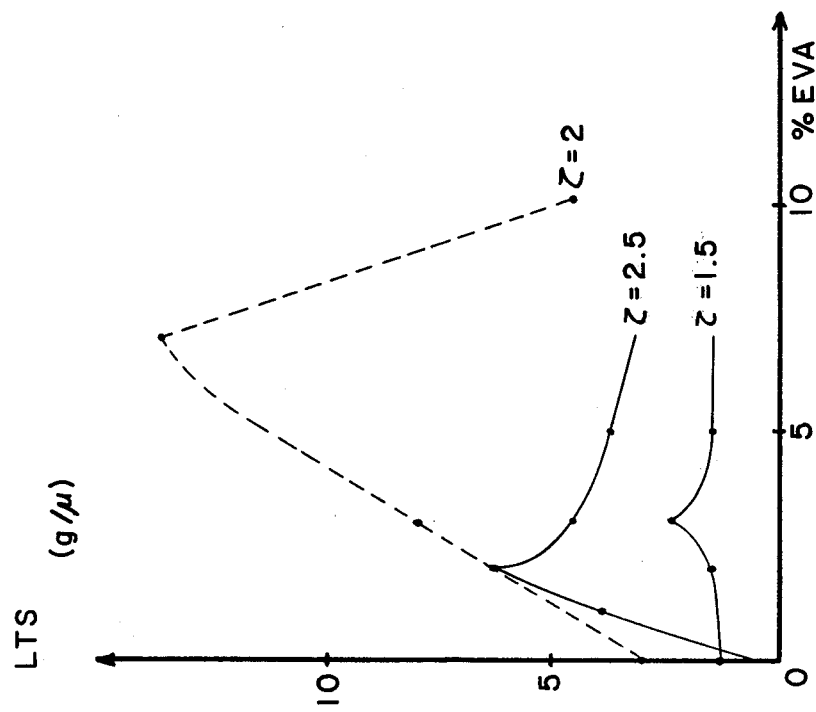

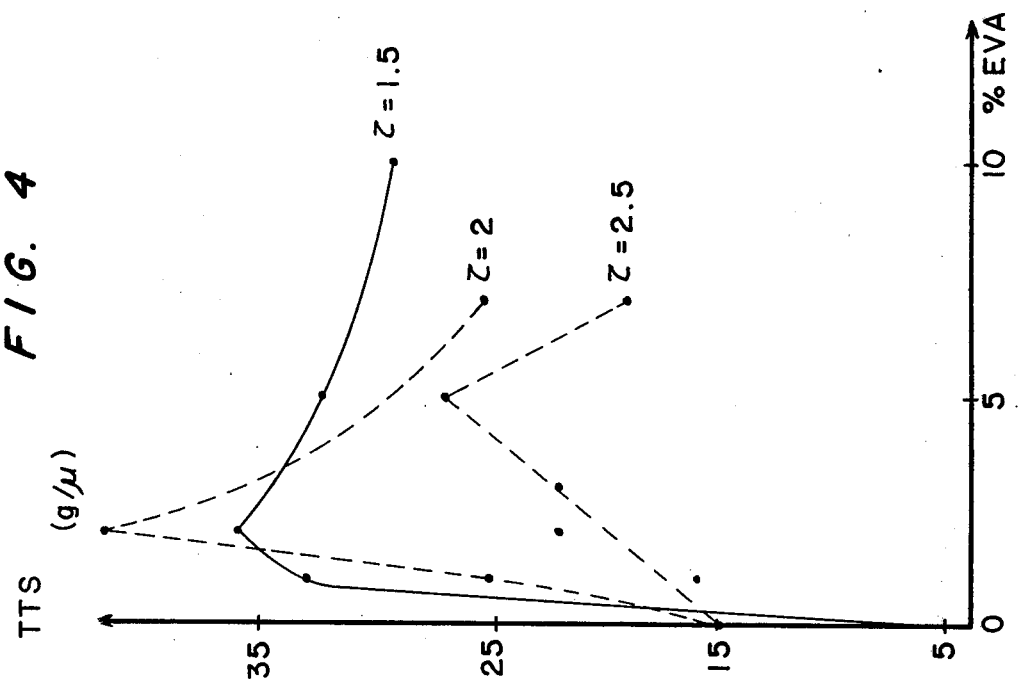
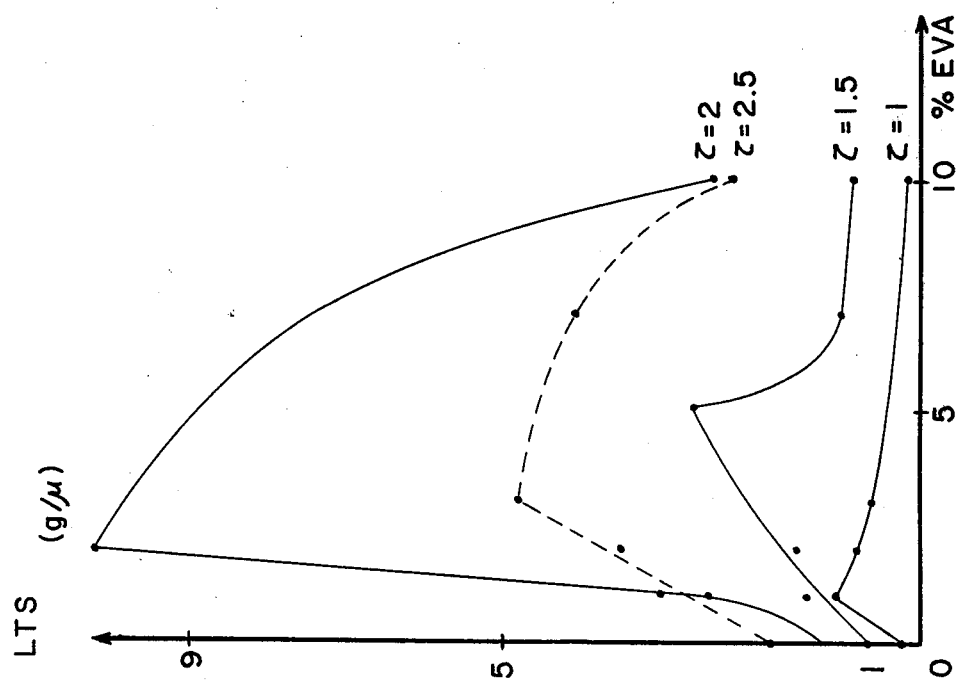

POLYOLEFINIC COMPOSITIONS CONTAINING E/VA COPOLYMER

The present invention is concerned with polyolefin compositions which can be used to make films having a high tear strength and high tensiometric properties.

The inadequacy of the mechanical properties of poly-1-butene films, coupled with their high manufacturing costs, has hitherto prevented the commercial development of these films.

It is, therefore, an object of this invention to provide polyolefin compositions based on 1-butene polymers which, when formed into films, have excellent mechanical properties, and which can be produced economically.

According to the present invention, there are provided polyolefin compositions comprising:

(a) from 92 to 99% by weight of a polyolefin having a melt index of from 0.5 to 5 and selected from the group consisting of isotactic poly-1-butene and butene-ethylene copolymers containing less than 2% of ethylene units, and (b) from 1 to 8% by weight of an ethylene-vinyl acetate copolymer having a vinyl acetate content of from 5 to 35% by weight, preferably 9 to 25%, and a melt index of from 0.5 to 5.

The isotactic poly-1-butene referred to is a 1-butene homopolymer having an isotacticity index, measured by its insolubility in diethyl ether, of at least 90%. The preferred melt index of the isotactic poly-1-butene is from 2 to 4. The butene-ethylene copolymers containing less than 2% of ethylene units are also isotactic, i.e. their isotacticity index is at least 90%. Antioxidants, anti-UV agents and/or slip agents, in the usual proportions, can be added to the compositions according to the invention.

These compositions give films having good tensiometric characteristics and a high tear strength. Their production is facilitated by the good compatibility of the two polymers employed and is carried out, in accordance with the conventional techniques, by mixing at a temperature above the melting points of the two polymers. The compositions according to the invention can also be readily converted into films, sheets, slabs, moldings and tubes by conventional extrusion and compression molding techniques. The preferred application of the compositions is the production of films, because such films are very suitable for the manufacture of container sacks for large loads, ranging up to 1,500 kg, garden covers, greenhouse films and retractable covers.

The choice of the most appropriate composition for a given application will be better understood from the examples which follow, which are given to illustrate the invention and without implying any limitation thereto.

BRIEF DESCRIPTION OF THE DRAWINGS

FIGS. 1 and 3 are curves showing the longitudnal tear strength of poly-1-butene-ethylene/vinyl acetate blends as a function of content of ethylene-vinyl acetate copolymer and blow-up ratio.

FIGS. 2 and 4 are similar curves showing the transverse tear strength.

EXAMPLE 1

The materials used in the compositions of this example were poly-1-butene having a density of 0.915 g/cm³, a melt index of 2 g/10 minutes (determined in accordance with ASTM D.1238.65T) and 98% isotacticity (measured by the insolubility in diethyl ether), and an ethylene/vinyl acetate copolymer having a melt index of 2 g/10 minutes and containing 25% of vinyl acetate. These two materials were first dry mixed for 30 minutes and were then mixed further at 155° C. on an extruder equipped with a conical-profile screw turning at 50 revolutions per minute. The composition thus prepared was extruded to form a 50 microns thick tubular film on an extruder equiped with a conical-profile screw turning at 40 revolutions per minute, the polymer composition being raised to a temperature of 190° C. The good compatibility of the two resins could be assessed visually from the absence of flaws in the film obtained.

After waiting for eight days, the longitudinal tear strength LTS and the transverse tear strength TTS, expressed in $g/\mu$ (in order to take into acount possible differences in thickness), of the films were measured in accordance with ASTM D 1922. The results of these measurements are given in FIGS. 1 and 2 of the accompanying drawings, which show the variation in the tear strength as a function of, on the one hand, the content, by weight, of the ethylene-vinyl acetate copolymer in the composition studied and, on the other hand, the blow-up ratio $\tau$ used during the extrusion of the film; FIG. 1 refers to LTS and FIG. 2 to TTS. The copolymer contents investigated ranged from 0 to 10% by weight.

In Table 1, the values of the various tensiometric properties have been given as a function of the content, $x$, in % by weight of the ethylene-vinyl acetate copolymer in the composition; these properties are the longitudinal tensile strength L Tens and the transverse tensile strength T Tens expressed in kg/cm² and the longitudinal elongation at break LEB and transverse elongation at break TEB expressed in %.

TABLE I

| x % | L Tens | T Tens | LEB | TEB |
|---|---|---|---|---|
| 0 | 264 | 190 | 122 | 102 |
| 5 | 277 | 248 | 178 | 170 |
| 7 | 309 | 277 | 210 | 220 |
| 10 | 261 | 222 | 174 | 170 |

EXAMPLE 2

The materials used in the compositions of this example were poly-1 -butene having a density of 0.918 g/cm³, a melt index of 2 g/10 minutes, and an isotacticity of 98% (determined as in Example 1) and an ethylene-vinyl acetate copolymer having a melt index of 2 g/10 minutes and containing 9% of vinyl acetate.

Compositions were prepared and then extruded as films as described in Example 1. The tear strengths of the films obtained were measured as in Examples 1, and their variation is shown in FIGS. 3 and 4 of the accompanying drawings as a function of the copolymer content and of the blow-up ratio, FIG. 3 referring to LTS and FIG. 4 to TTS.

EXAMPLE 3

The materials used in the compositions of this example were firstly, the ethylene-vinyl acetate copolymer used in Example 1 and, secondly, isotactic poly-1-butene having a density of 0.919 g/cm³ and a melt index of 3.5 g/10 minutes. Compositions were prepared under the conditions of Example 1 and were then converted to slabs; molding was carried out for 6 minutes at 185° C.

and a pressure of 300 kg/cm$^2$, and the material was then allowed to cool for 10 minutes at a pressure of 100 kg/cm$^2$. After waiting for eight days, various properties were measured as a function of the content, $x$, in % by weight of the ethylene-vinyl acetate copolymer in the composition; these properties were the tensile strength Tens in kg/cm$^2$, the elongation at break EB in % measured in accordance with Standard Specification ISO R 1184, and the hardness H measured according to the DIN Standard Specification after 60 seconds. The results of these measurements are shown in Table II.

TABLE II

| x % | Tens | EB | H |
|---|---|---|---|
| 0 | 230 | 149 | 400 |
| 5 | 376 | 338 | 318 |
| 15 | 323 | 344 | 303 |
| 100 | 268 | 757 | 32 |

What is claimed is:

1. Polyolefin compositions comprising:
   (a) from 92 to 99% by weight of isotactic poly-1-butene having a melt index of from 0.5 to 5, and
   (b) from 1 to 8% by weight of an ethylene-vinyl acetate copolymer having a melt index of from 0.5 to 5 and a vinyl acetate content of from 9 to 35% by weight.

2. Polyolefin compositions according to claim 1, wherein said ethylene-vinyl acetate copolymer has a vinyl acetate content of from 9 to 25% by weight.

3. Polyolefin compositions according to claim 1, wherein said isotactic poly-1-butene has a melt index of from 2 to 4.

4. Film formed from a polyolefin composition comprising:
   (a) from 92 to 99% by weight of isotactic poly-1-butene having a melt index of from 0.5 to 5, and
   (b) from 1 to 8% by weight of an ethylene-vinyl acetate copolymer having a melt index of from 0.5 to 5 and a vinyl acetate content of from 9 to 35% by weight.